US012673830B2

(12) United States Patent　　(10) Patent No.: US 12,673,830 B2
Isogawa et al.　　　　　　　　　(45) Date of Patent: Jul. 7, 2026

(54) DETECTION APPARATUS, DETECTION METHOD, AND CONVEYANCE SYSTEM

(71) Applicant: KABUSHIKI KAISHA TOSHIBA, Kawasaki (JP)

(72) Inventors: Kenzo Isogawa, Tokyo (JP); Toshiyuki Ono, Kawasaki (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 1003 days.

(21) Appl. No.: 17/818,491

(22) Filed: Aug. 9, 2022

(65) Prior Publication Data

US 2023/0219766 A1　　Jul. 13, 2023

(30) Foreign Application Priority Data

Jan. 12, 2022　　(JP) ................................. 2022-003002

(51) Int. Cl.
B65G 43/08　　　(2006.01)
G06V 10/766　　(2022.01)

(52) U.S. Cl.
CPC ........... B65G 43/08 (2013.01); G06V 10/766 (2022.01); G06V 2201/06 (2022.01)

(58) Field of Classification Search
None
See application file for complete search history.

(56) References Cited

U.S. PATENT DOCUMENTS

| | | | |
|---|---|---|---|
| 2005/0105766 A1 | 5/2005 | Fesquet et al. | |
| 2014/0347473 A1* | 11/2014 | Wolff | G06T 5/77 |
| | | | 348/135 |
| 2015/0042791 A1 | 2/2015 | Metois et al. | |
| 2017/0160080 A1* | 6/2017 | Lacaze | G01B 11/2522 |
| 2019/0073880 A1* | 3/2019 | Nobuoka | G06F 18/22 |

FOREIGN PATENT DOCUMENTS

| | | |
|---|---|---|
| JP | 2008-290024 A | 12/2008 |
| JP | 4405918 B2 | 1/2010 |
| JP | 2022-164151 A | 10/2022 |

OTHER PUBLICATIONS

Japanese Decision to Grant issued Aug. 5, 2025 in Japanese Patent Application No. 2022-003002 (with unedited computer-generated English Translation), 5 pages.
Japanese Office Action issued Feb. 25, 2025 in Japanese Patent Application No. 2022-003002 (with unedited computer-generated English Translation), 10 pages.

* cited by examiner

*Primary Examiner* — Matthew G Marini
(74) *Attorney, Agent, or Firm* — Oblon, McClelland, Maier & Neustadt, L.L.P.

(57) ABSTRACT

According to one embodiment, a detection apparatus includes a processor. The processor acquires height information at a plurality of points in a subject. The processor determines whether or not one or more steps are present at a height equal to or higher than a predetermined height from a reference in the subject based on the height information. The processor detects that the subject is in a state in which a plurality of objects are overlapped, if the number of the steps is equal to or greater than a first threshold value.

12 Claims, 13 Drawing Sheets

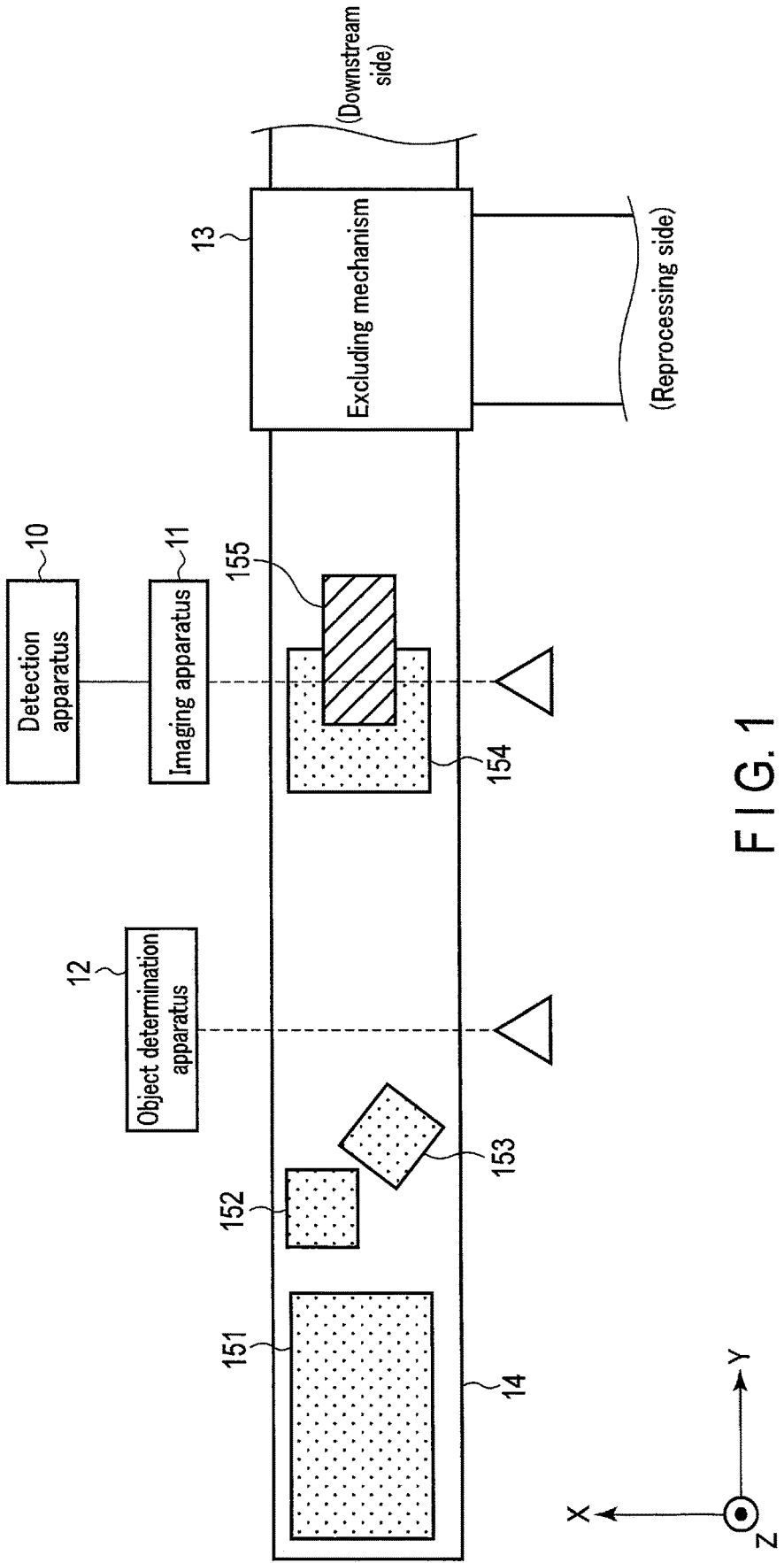
F I G. 1

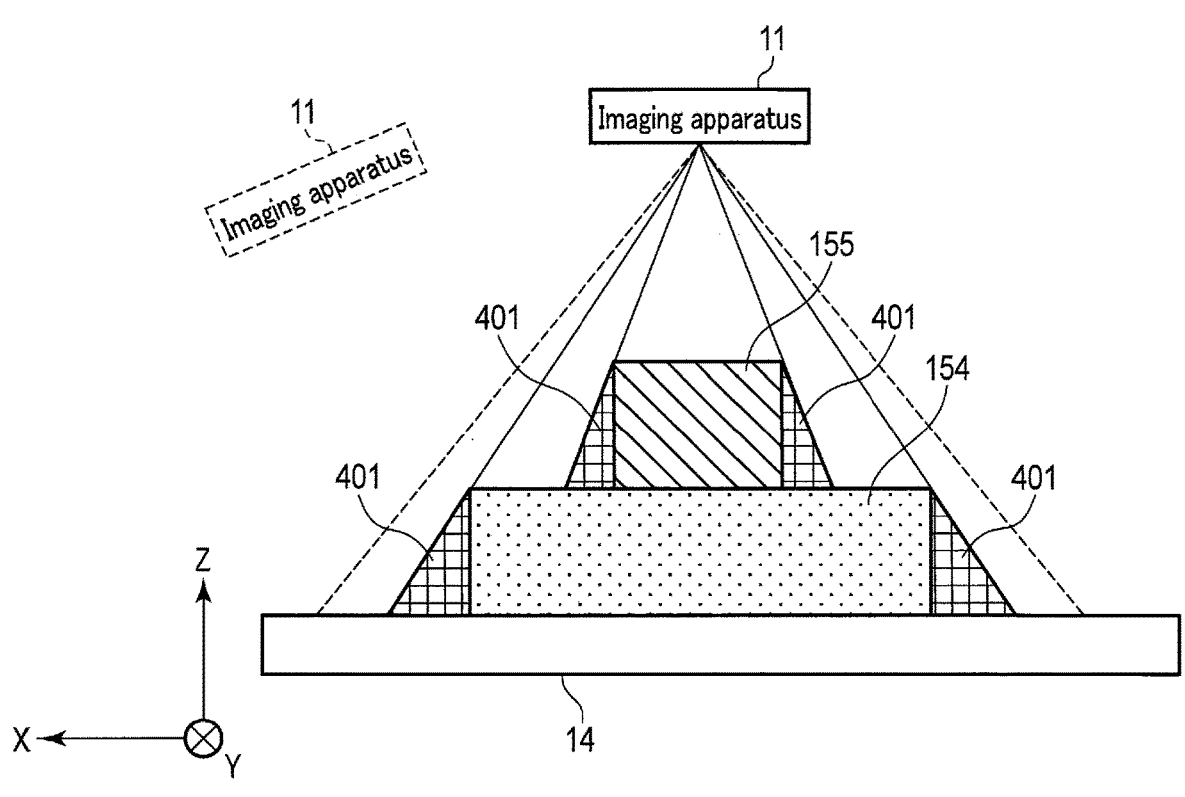
F I G. 4
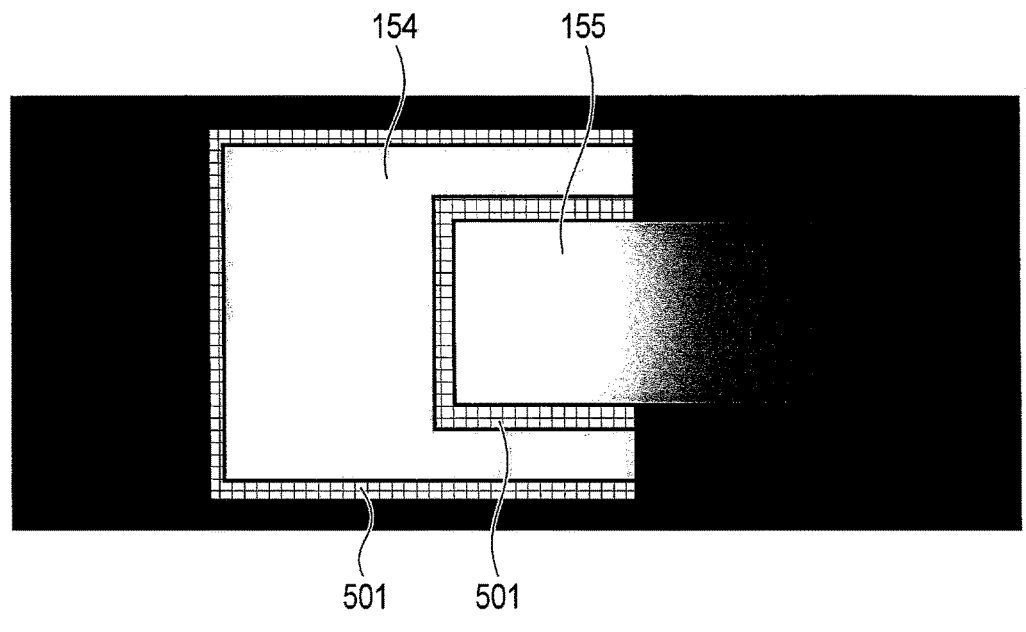
F I G. 5

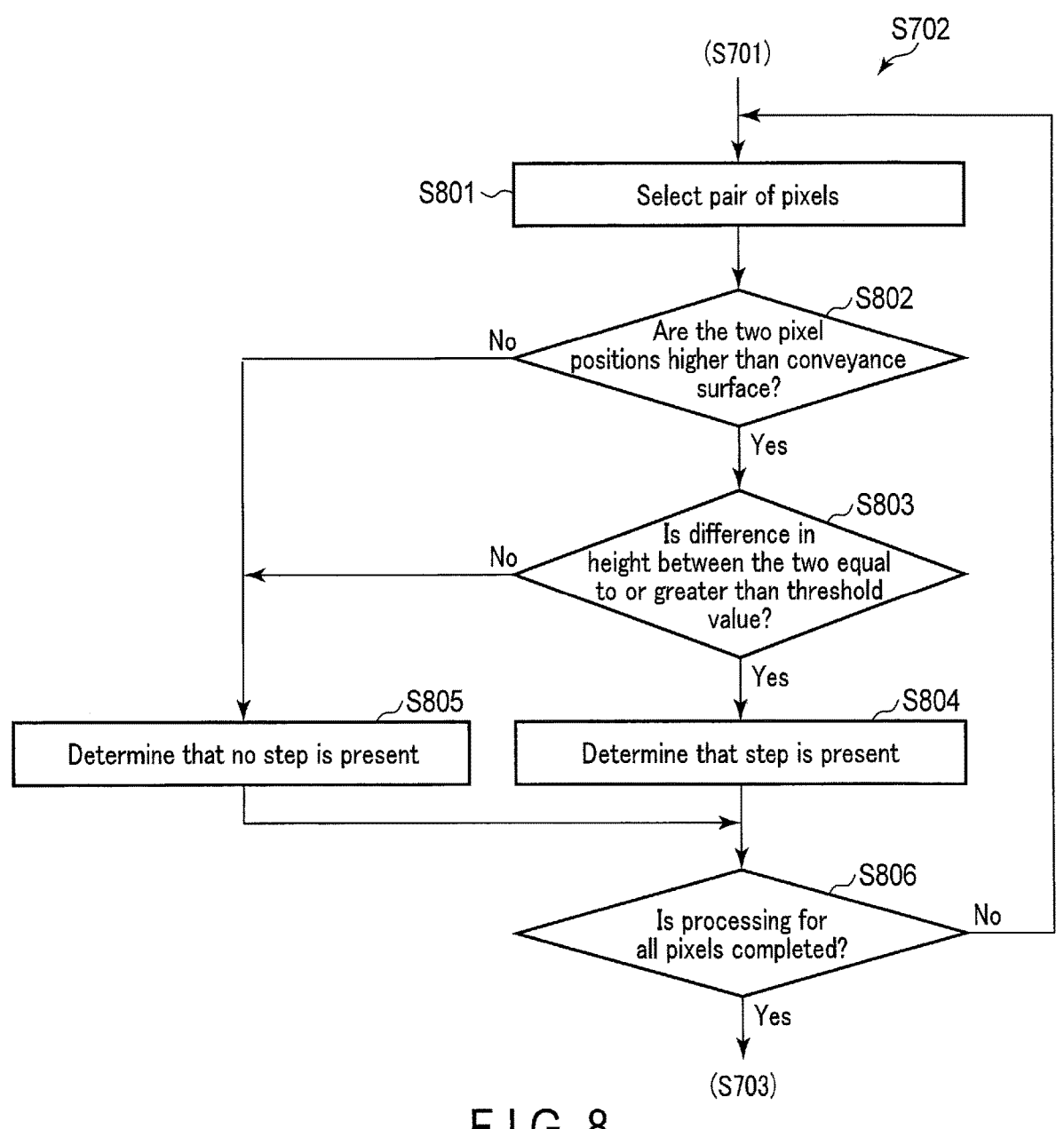
(S701)     S702
S801 — Select pair of pixels
S802
Are the two pixel positions higher than conveyance surface?
No
Yes
S803
Is difference in height between the two equal to or greater than threshold value?
No
Yes
S805
Determine that no step is present
S804
Determine that step is present
S806
Is processing for all pixels completed?
No
Yes
(S703)
F I G. 8

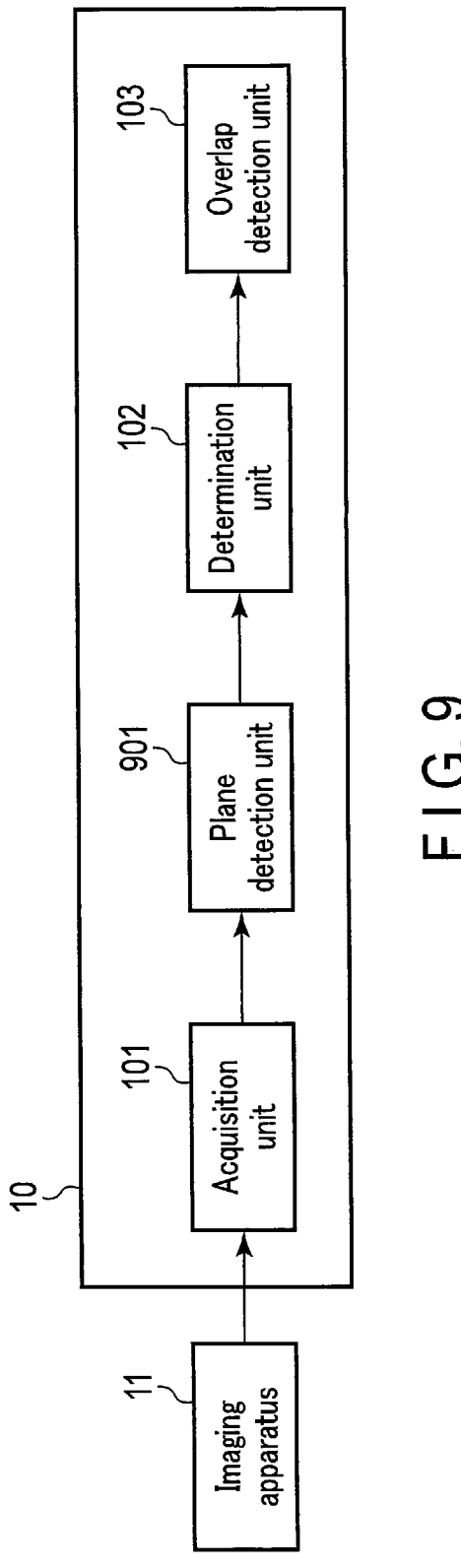
F I G. 9

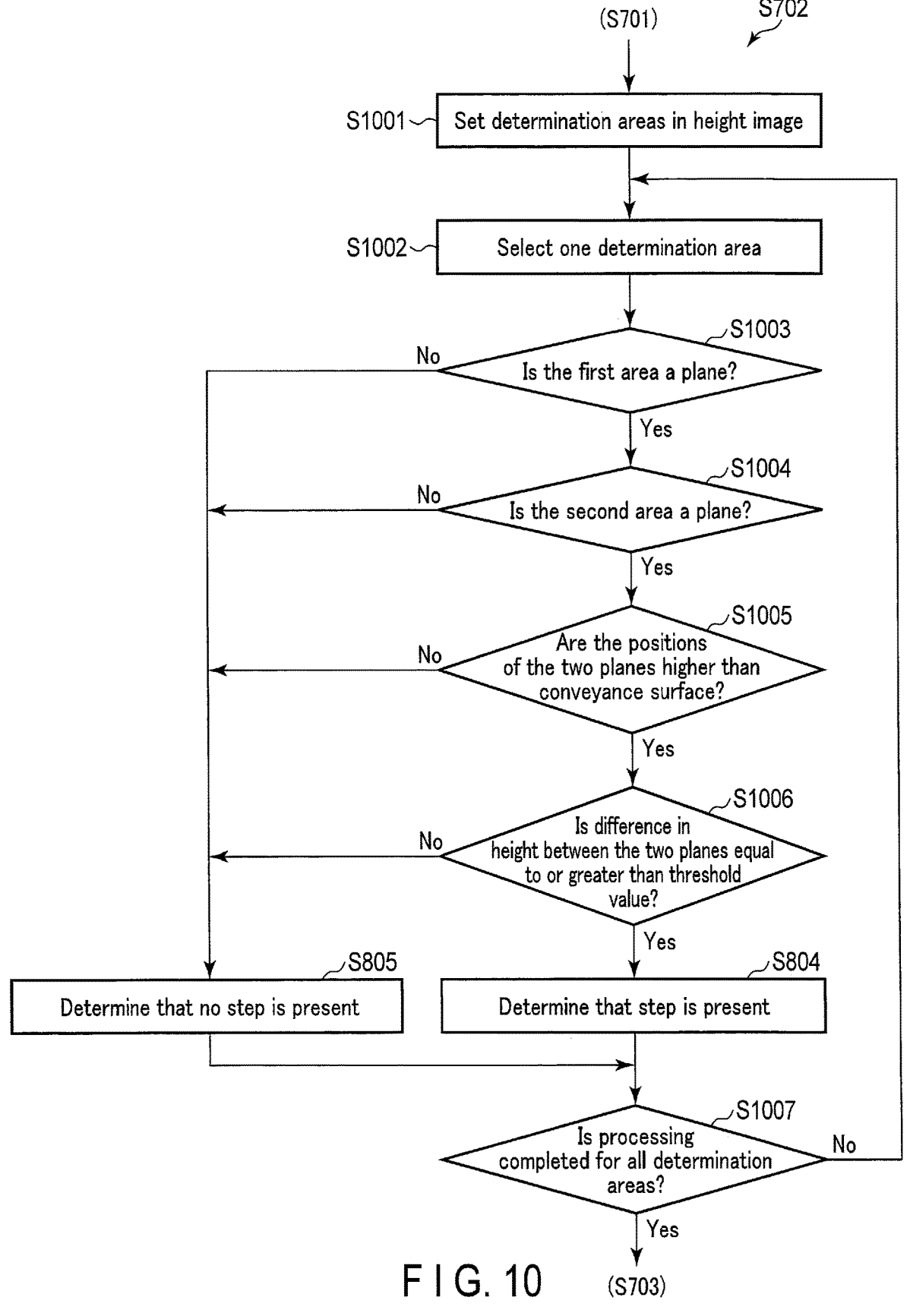
FIG. 10        (S703)

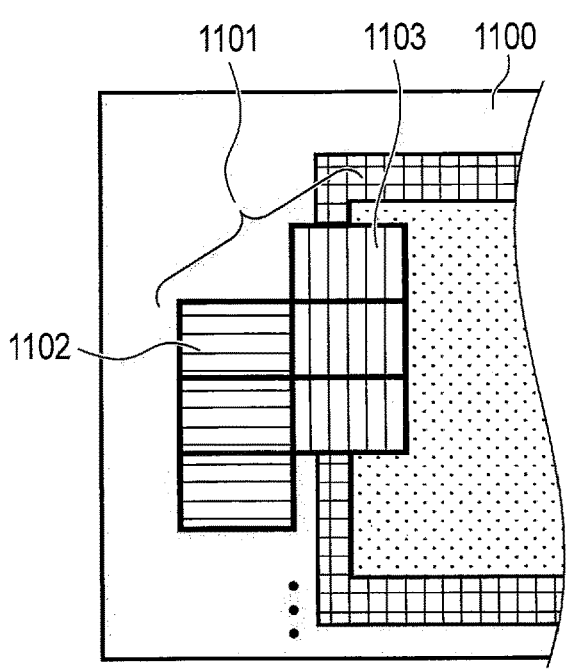
F I G. 11C
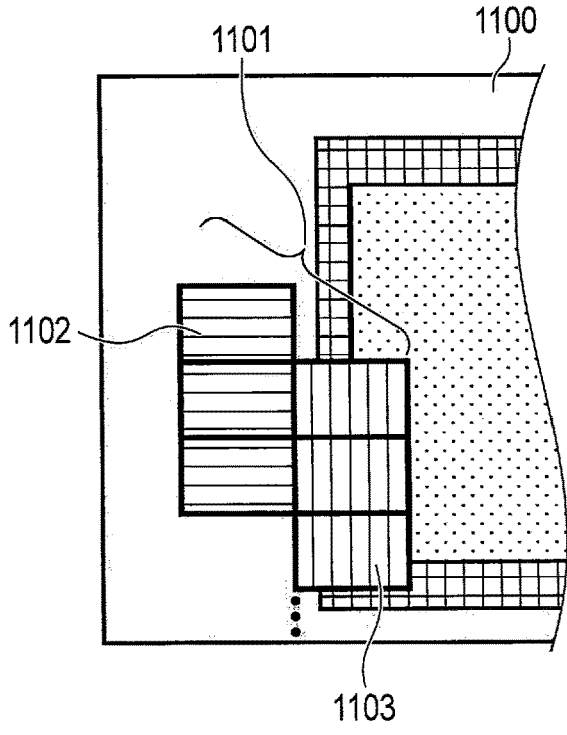
F I G. 11D

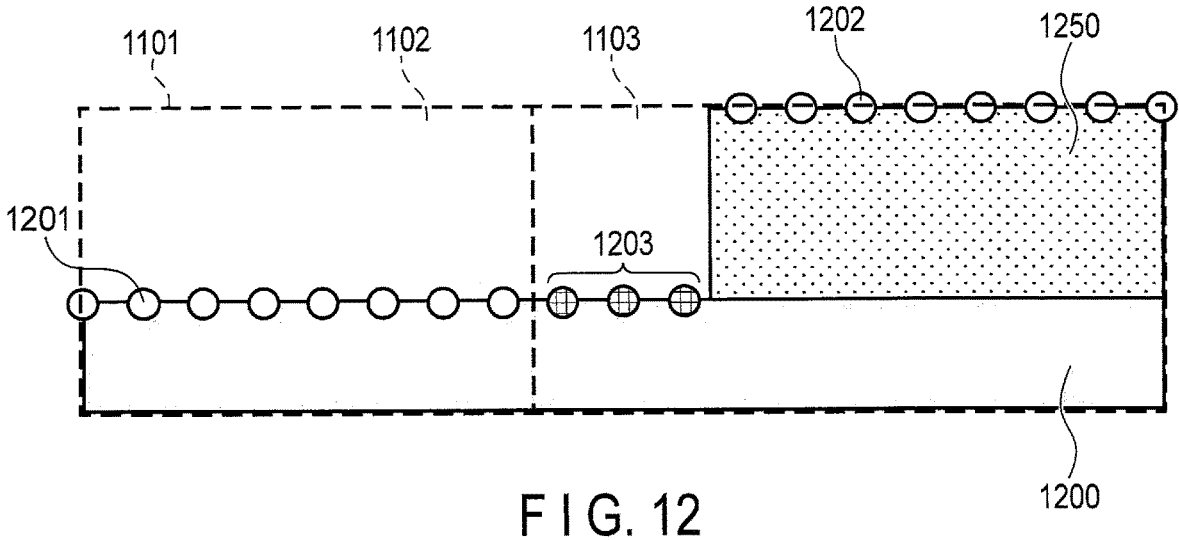
F I G. 12
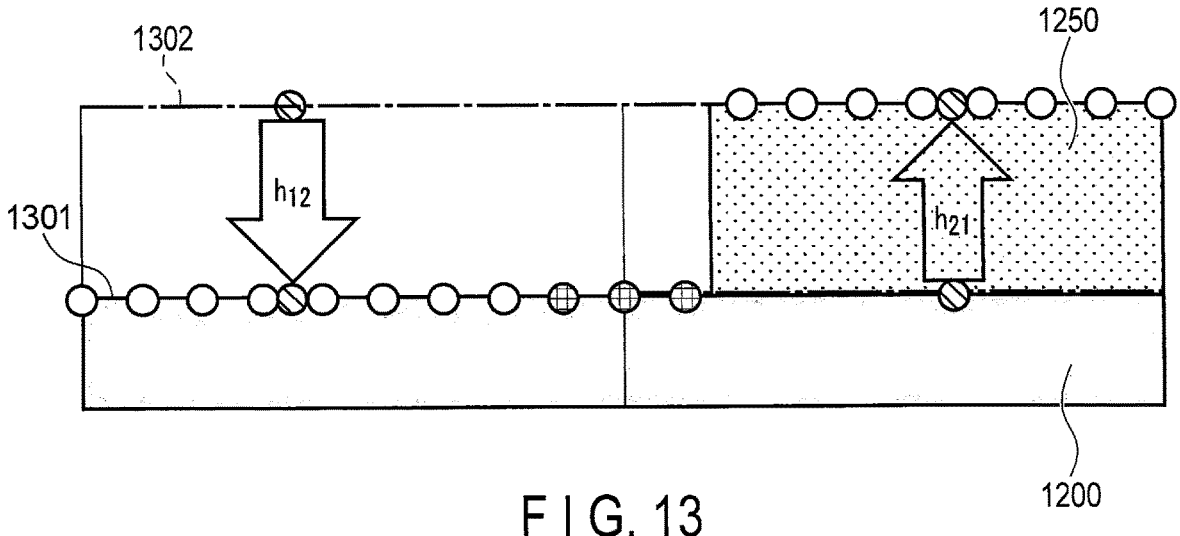
F I G. 13

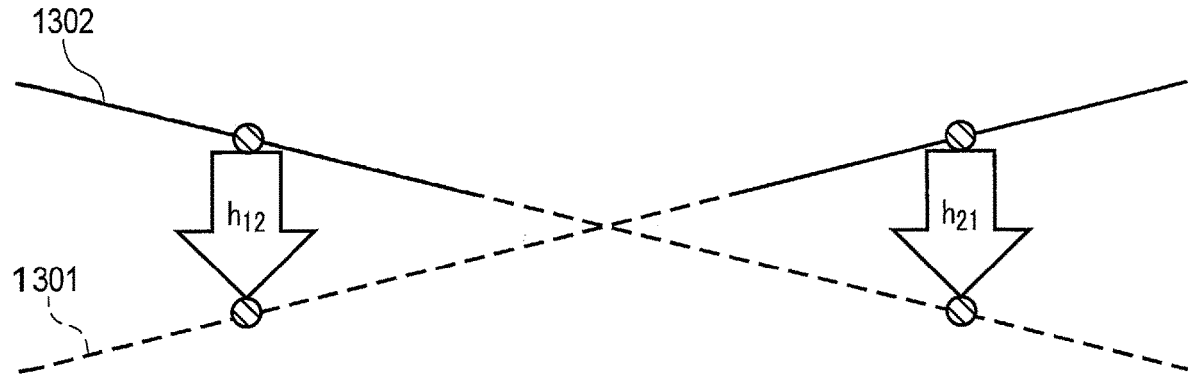
F I G. 14

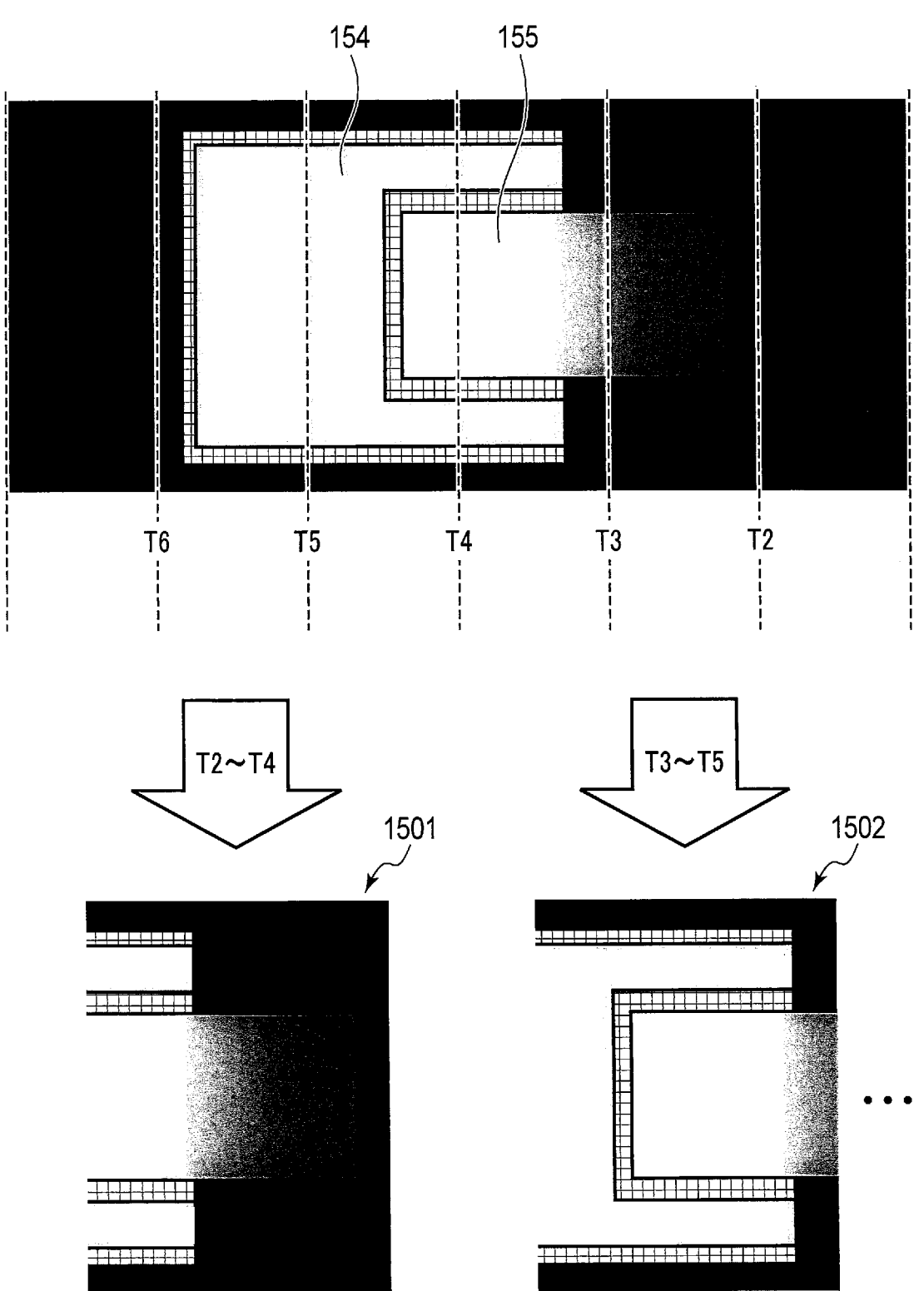
F I G. 15

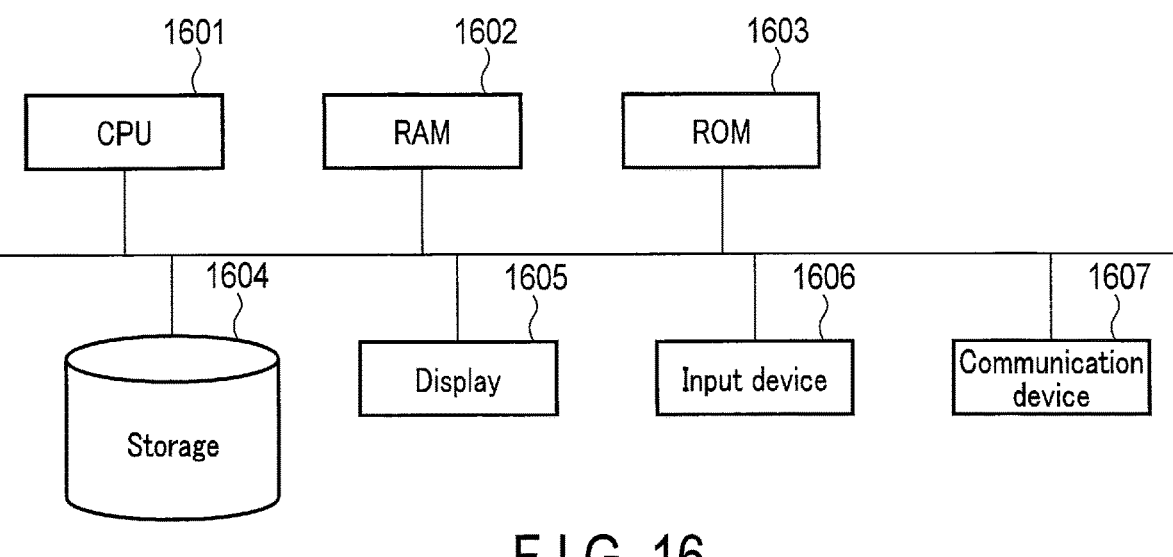
F I G. 16

1

DETECTION APPARATUS, DETECTION METHOD, AND CONVEYANCE SYSTEM

CROSS-REFERENCE TO RELATED APPLICATION

This application is based upon and claims the benefit of priority from Japanese Patent Application No. 2022-003002, filed Jan. 12, 2022, the entire contents of which are incorporated herein by reference.

FIELD

Embodiments described herein relate generally to a detection apparatus, a detection method, and a conveyance system.

BACKGROUND

In delivery of small packages, as typified by postal packages or the like, packages are collected in a disorganized manner during pickup, and work of separating the packages and loading them into an address reading apparatus in a subsequent stage is performed. The separating work is manually conducted, and a singulator that automates the work is effective for labor saving. Inside the singulator, the packages are separated by changing the flow rate of the conveyor or forming steps in the conveyor. However, there are cases in which the packages cannot be completely separated. With regard to detection of overlapping postal items, a method of determining overlapping postal items by extracting outlines of envelopes is known. However, the known method is applicable to thin rectangular packages, such as envelopes, but cannot adapt to thick and irregularly shaped postal items intended for the singulator.

BRIEF DESCRIPTION OF THE DRAWINGS

FIG. 1 is a conceptual diagram illustrating a conveyance system.

FIG. 4 is a view illustrating an example of packages imaged by an imaging apparatus viewed in a Y-axis direction.

FIG. 5 is a view illustrating a height image obtained by a detection apparatus.

FIG. 8 is a flowchart illustrating details of step determination processing.

FIG. 9 is a block diagram illustrating a detection apparatus according to a second embodiment.

FIG. 10 is a flowchart illustrating details of step determination processing according to the second embodiment.

FIG. 11C is a view illustrating an example of a method for setting a determination area.

2

Figure 2:
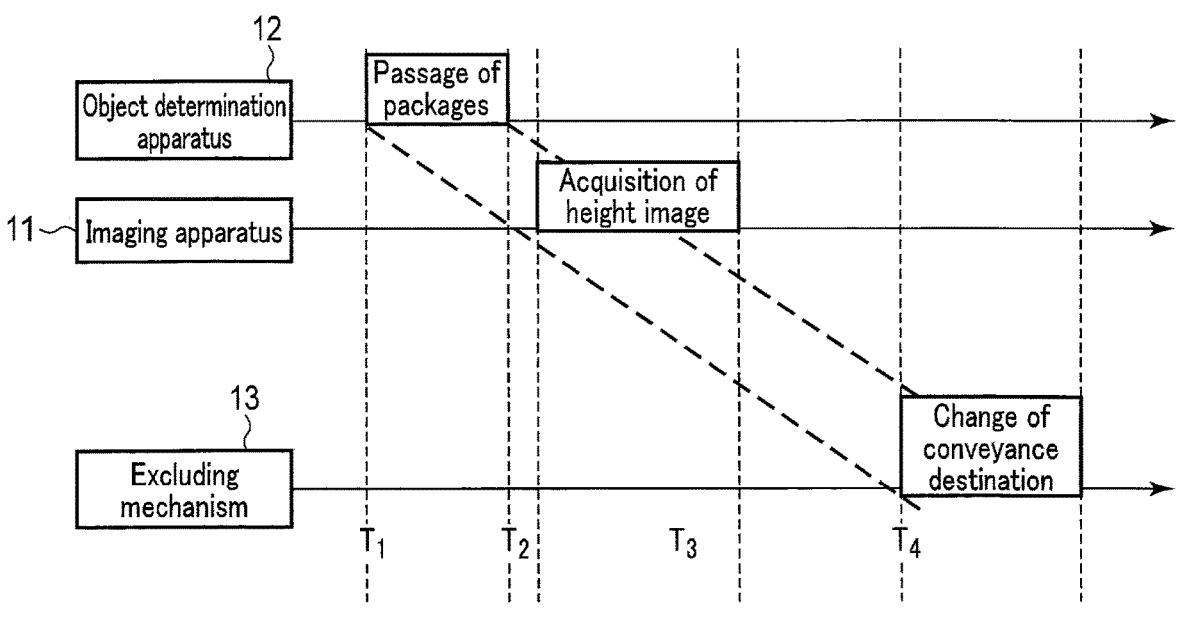
FIG. 2 is a timing chart relating to operation timings of the conveyance system.

FIG. 11D is a view illustrating an example of a method for setting a determination area.

FIG. 12 is a view illustrating plane detection processing of a plane detection unit according to the second embodiment.

FIG. 13 is a view illustrating plane detection processing of a plane detection unit according to a third embodiment.

FIG. 14 is a view illustrating a case in which mathematical signs of differences in height are different.

FIG. 15 is a view illustrating an example in which a height image is a partial image.

FIG. 16 is a diagram illustrating an example of a hardware configuration of the detection apparatus.

DETAILED DESCRIPTION

In general, according to one embodiment, a detection apparatus includes a processor. The processor acquires height information at a plurality of points in a subject. The processor determines whether or not one or more steps are present at a height equal to or higher than a predetermined height from a reference in the subject based on the height information. The processor detects that the subject is in a state in which a plurality of objects are overlapped, if the number of the steps is equal to or greater than a first threshold value.

In the following descriptions, a detection apparatus, a detection method, and a conveyance system according to the embodiments will be explained with reference to the drawings. In the embodiments described below, elements assigned with the same reference symbols are assumed to perform the same operations, and redundant descriptions thereof will be omitted as appropriate.

First Embodiment

A conveyance system according to the first embodiment will be explained with reference to the schematic diagram of FIG. 1.

The conveyance system includes a detection apparatus 10, an imaging apparatus 11, an object determination apparatus 12, an excluding mechanism 13, and a conveyance mechanism 14. FIG. 1 illustrates a case in which the detection apparatus 10 and the imaging apparatus 11 are separate bodies; however, the detection apparatus 10 and the imaging apparatus 11 may be integrally formed as one body.

The conveyance mechanism 14 is, for example, a conveyor. As the conveyor rotates, an object (also referred to as a package) which is a target of conveyance flows from an upstream side toward a downstream side. It is assumed that packages are automatically supplied on the upstream side of the conveyance mechanism 14. Packages vary in shape and size, from a large package 151 to a small package 152. The orientation of the packages on the conveyance mechanism 14 may vary; for example, in the case of a package 153, the longitudinal direction of the package does not align with the direction of conveyance of the conveyance mechanism 14. Furthermore, a state of overlapped feeding, in which a plurality of overlapped packages (e.g., packages 154 and 155) are conveyed, may occur.

The object determination apparatus 12 senses a determination area (or a determination line) on the conveyance mechanism 14, and detects whether or not a package passed the area. If passage of the object is detected, time of the passage is acquired.

The imaging apparatus 11 images or senses an imaging area (or an imaging line) on the conveyance mechanism 14, and acquires height information of the package which is a subject passing through the area.

The detection apparatus 10 receives the height information from the imaging apparatus 11, and detects whether or not the packages are in the state of overlapped feeding.

The excluding mechanism 13 feeds a package detected as being not in the state of overlapped feeding, namely, a package detected as a single package, to the downstream side of the conveyance mechanism 14. If the detection apparatus 10 detects that the packages are in the state of overlapped feeding, the excluding mechanism 13 performs controlling the packages to flow in a direction different from the downstream side of the conveyance mechanism 14 (also referred to as a reprocessing side). As a result, the packages in the overlapped feeding are prevented from flowing to the downstream side. The excluding mechanism 13 is assumed to be, for example, a sorting plate which can be driven by a control signal, but may have any other structure as long as it can change the direction of conveyance of the package by a control signal.

A timing chart relating to operation timings of the conveyance system will be explained with reference to FIG. 2.

FIG. 2 is a timing chart obtained by calculating and graphing the timings at which a package sequentially enters the object determination apparatus 12, the imaging apparatus 11 and the excluding mechanism 13 in this order. A time section from a time when the package enters the object determination apparatus 12 to a time when the package reaches the imaging line of the imaging apparatus 11 can be calculated based on a time when the package enters the determination line of the object determination apparatus 12, a time when the package has passed the determination line, a moving speed of the package, and a distance between the determination line of the object determination apparatus 12 and the imaging line of the imaging apparatus 11. A time section from a time when the package reaches the imaging line of the imaging apparatus 11 to a time when the package reaches the excluding mechanism 13 can also be calculated in the same manner. Thus, based on the calculated time, each of the object determination apparatus 12, the detection apparatus, and the excluding mechanism 13 can ascertain at what timing the package reaches it, so that a detection result of the detection apparatus 10 and an operation of the excluding mechanism 13 can be correctly associated with the package.

An example of imaging the package by the imaging apparatus 11 will be explained with reference to FIGS. 3 and 4.

Figure 3:
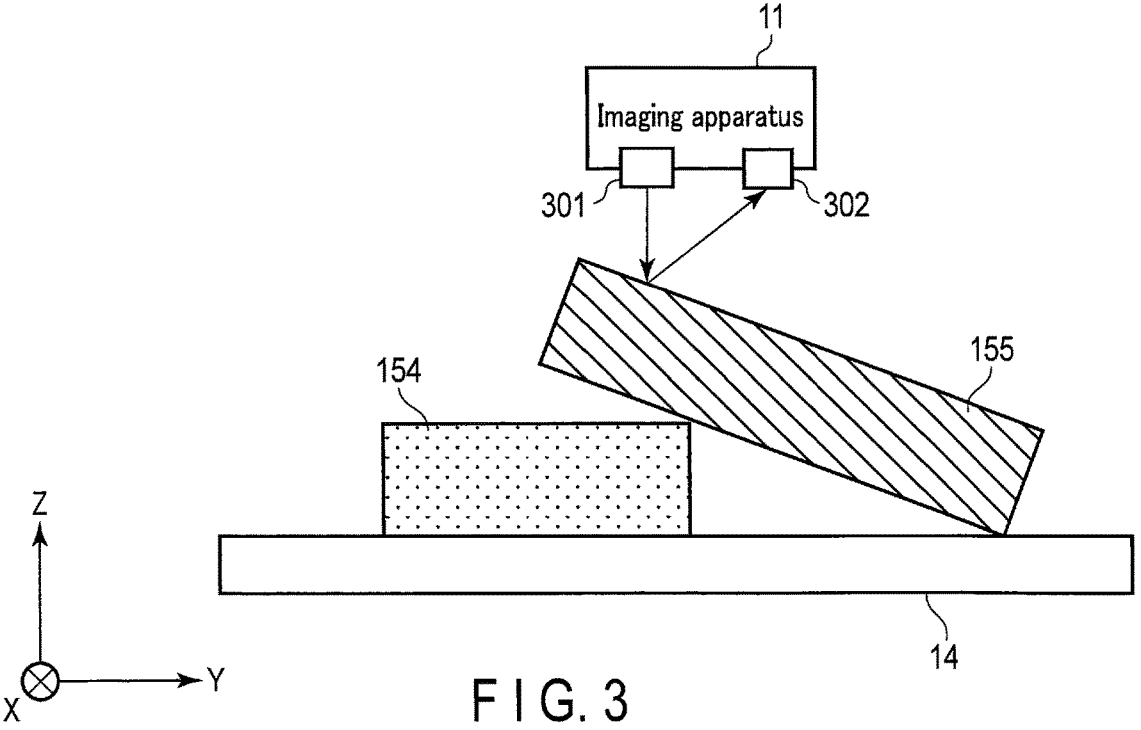
FIG. 3 is a view illustrating an example of packages imaged by an imaging apparatus viewed in an X-axis direction.

FIG. 3 is a view illustrating a placement of the conveyance mechanism 14 and the imaging apparatus 11 viewed in the X-axis direction, where the package travels from left to right. FIG. 4 is a view illustrating a placement of the conveyance mechanism 14, the detection apparatus 10, and the imaging apparatus 11 viewed in the Y-axis direction from the upstream side.

The imaging apparatus 11 is, for example, an optical sectioning apparatus which emits light from an emitting section 301 toward a conveyance surface of the conveyance mechanism 14 on which the package is placed. The light is linear in the direction shown in FIG. 3, and spreads out in a fan-like form from the emitting section 301 in the direction shown in FIG. 4 and irradiates the conveyance surface. The emitted light is reflected by the package or the conveyance surface, and is incident into a light receiving section 302 as the reflected light. The image formed by the reflected light has a linear shape when there is no package on the conveyance surface; however, when a package is present on the conveyance surface, the image varies from the linear shape. In the example illustrated in FIG. 3, since the packages 154 and 155 are present, the image formed by the reflected light varies from the linear shape. Based on the varied shape of the image, the imaging apparatus 11 acquires height information on a height of the subject (the package in this embodiment) from the conveyance surface at a position where the subject is irradiated. A numerical value string representing a height along a line obtained by one measurement is referred to as a profile.

Since the light is emitted from one point of the emitting section 301, a shadow 401 where the light is not applied may be formed. In the example illustrated in FIG. 4, shadows 401 are formed in corner portions between the package 154 and the conveyance surface and corner portions between the packages 154 and 155.

The emitting section 301 in the imaging apparatus 11 is not necessarily located right above the conveyance mechanism 14, but may be located at an end portion in the width direction of the flow path of the conveyance mechanism 14 and oriented toward a central portion of the flow path, like the imaging apparatus 11 depicted with broken lines in FIG. 4. With this location of the imaging apparatus, the possibility of shadows 401 being formed on a side surface of the package facing the imaging apparatus can be reduced. The imaging apparatus 11 is not limited to an optical sectioning apparatus, but may be any type of apparatus that can acquire at least height information of the subject, such as a time-of-flight (ToF) camera and a stereo camera.

Next, an example of a height image acquired by the detection apparatus 10 will be explained with reference to FIG. 5.

The imaging apparatus 11, which is fixed, images a package moving on the conveyance mechanism 14 a plurality of times to acquire profiles, and a height image is generated from the acquired profiles. The height image is a two-dimensional array obtained by arranging the acquired profiles in order of acquired time (time sequence order). For example, FIG. 5 illustrates a height image obtained in a case where the packages 154 and 155 in the state illustrated in FIGS. 3 and 4 are imaged as a subject. In the height image, the conveyance surface of the conveyance mechanism 14 is expressed in black, and the greater the height of the point corresponding to a pixel from the conveyance surface, the whiter the height image is. If the imaging apparatus 11 is an optical sectioning apparatus, due to characteristics of images acquired by optical sectioning apparatuses, height information cannot be acquired in portions in the packages shadows, such as the shadows 401 in FIG. 4, where the light from the optical sectioning apparatus is not applied. Therefore, defective areas 501 made of pixels having no height may be formed. The defective areas 501 depend on the location or shape of the subjects, and cannot be easily predicted in advance. In the detection apparatus 10 according to the present embodiment, even when such predictable defective areas 501 are present, overlapping of objects or overlapped feeding can be satisfactorily detected.

Figure 6:
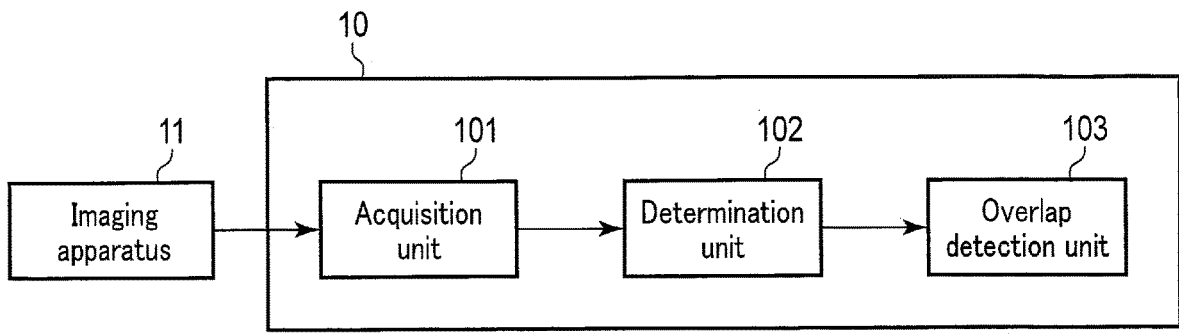
FIG. 6 is a block diagram illustrating a detection apparatus according to a first embodiment.

Next, components of the detection apparatus 10 according to the first embodiment will be explained with reference to the block diagram of FIG. 6.

The detection apparatus 10 of the first embodiment includes an acquisition unit 101, a determination unit 102, and an overlap detection unit 103.

The acquisition unit 101 receives a plurality of profiles relating to height information on a plurality of points in the subject from the imaging apparatus 11 and arranges the profiles in time sequence order, thereby acquiring a height image relating to the subject.

The determination unit 102 receives the height information from the acquisition unit 101, determines whether one or more steps are present in the subject at a predetermined height from a reference or higher, and generates a determination result.

The overlap detection unit 103 receives the determination result concerning the steps from the determination unit 102. If the number of steps is equal to or greater than a threshold value, the overlap detection unit 103 detects that the subject is in the state of a plurality of overlapped packages. Thus, in the first embodiment, occurrence of the overlapped feeding is detected.

Figure 7:
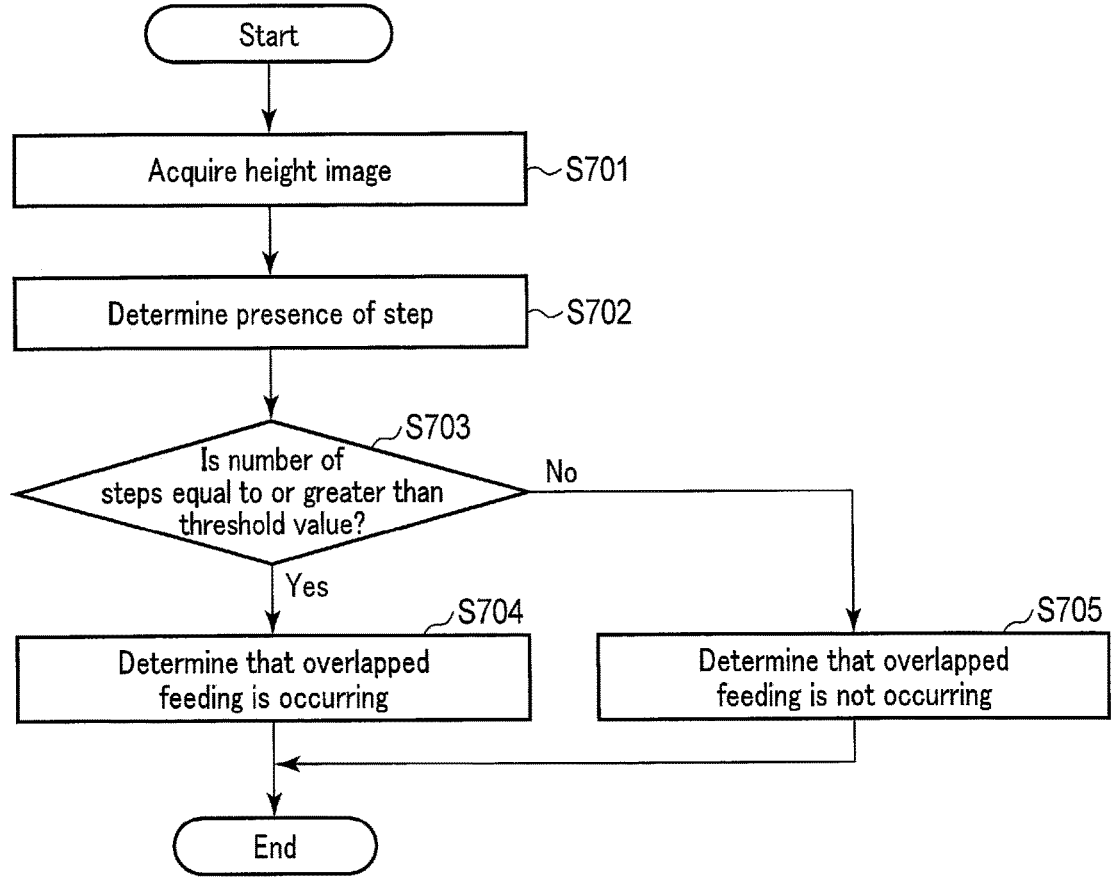
FIG. 7 is a flowchart illustrating overlapped feeding determination processing of the detection apparatus according to the first embodiment.

Next, overlapped feeding determination processing of the detection apparatus 10 according to the first embodiment will be explained with reference to the flowchart of FIG. 7.

In step S701, the acquisition unit 101 acquires height information, and generates a height image from a plurality of height information items in time sequence.

In step S702, the determination unit 102 determines a presence of a step in a package.

In step S703, the determination unit 102 determines whether the number of steps is equal to or greater than the threshold value. If the number of steps is equal to or greater than the threshold value, the processing proceeds to step S704. If the number of steps is smaller than the threshold value, the processing proceeds to step S705.

In step S704, the overlap detection unit 103 determines that overlapped feeding is occurring, since steps of a number corresponding to or greater than the threshold value are present.

In step S705, the overlap detection unit 103 determines that overlapped feeding is not occurring.

Next, details of the step determination processing in step S702 will be explained with reference to the flowchart of FIG. 8.

In step S801, the determination unit 102 selects a pair of pixels corresponding to predetermined pixel positions in the height image.

In step S802, the determination unit 102 determines whether or not the two pixel positions included in the pair of pixels are at a predetermined height from a reference or higher, namely, whether or not the pixel positions are higher than the conveyance surface in this embodiment. Specifically, based on the height information of the two pixels and the height information of the conveyance surface, if the determination unit 102 determines that the two pixel positions are higher than the conveyance surface, the processing proceeds to step S803. If the determination unit 102 determines that the height of at least one of the two pixel positions is the same as that of the conveyance surface, the processing proceeds to step S805.

In step S803, the determination unit 102 determines whether or not a difference in height between the two pixel positions is equal to or greater than a threshold value. Specifically, it suffices that the determination unit 102 calculates a difference in height between the two pixel positions as a difference in height. If the difference in height is equal to or greater than a threshold value, the processing proceeds to step S804. If the difference in height is smaller than the threshold value, the processing proceeds to step S805.

In step S804, the determination unit 102 determines that a step is present, since the positions of the two pixels are higher than the conveyance surface and the difference in height is equal to or greater than the threshold value.

In step S805, the determination unit 102 determines that no step is present between the positions of the two pixels.

In step S806, the determination unit 102 determines whether or not the determination processing from step S802 to step S805 for all pixels has been performed. If the determination processing for all pixels has been performed, the step determination processing by the determination unit 102 ends and the processing proceeds to step S703. If the determination processing for all pixels has not been performed, the processing returns to step S801 and the same processing is repeated for unprocessed pixel pairs.

According to the first embodiment described above, a difference in height between a pair of predetermined pixels is compared with the threshold value based on the height image of the subject. If steps of a number equal to or greater than the threshold value are present, it is determined that a plurality of objects are overlapped. In the case of conveyance of packages, it is determined that the packages are in the state of overlapped feeding. As a result, the performance of separating objects can be improved, regardless of the size, shape, and orientation of the objects.

Second Embodiment

The first embodiment, in some cases, may not correctly determine whether overlapped feeding is occurring. For example, if noise is superimposed on the profiles acquired by the imaging apparatus 11, the difference in level between two pixels as a pair of pixels may indicate a large value where no step is formed, or the difference in level may be smaller than the threshold value where a step is formed due to an influence of the noise. Further, if the area on the surface of the package where the two pixels are associated is small, a small unevenness on the surface of the package may be erroneously determined as a step. Furthermore, if a pixel used in determining whether a step is present is a pixel in a defective area, a step cannot be detected.

Therefore, in the second embodiment, by making a determination on two planes in a height image, an influence of noise and defective areas can be reduced, and determination accuracy relating to overlapped feeding of packages can be improved.

A detection apparatus 10 according to the second embodiment will be explained with reference to the block diagram of FIG. 9.

The detection apparatus 10 of the second embodiment includes an acquisition unit 101, a determination unit 102, an overlap detection unit 103, and a plane detection unit 901.

The plane detection unit 901 receives height information from the acquisition unit 101, and detects whether or not a first area and a second area set in the subject based on the height information respectively include planes. Specifically, the plane detection unit 901 detects whether or not a first plane is formed in the first area and a second plane is formed in the second area.

If the plane detection unit 901 detects that the first plane is formed in the first area and the second plane is formed in the second area and if a difference in height between the first plane and the second plane is greater than a threshold value, the determination unit 102 determines that a step is present.

Next, step determination processing of the detection apparatus 10 according to the second embodiment will be explained with reference to the flowchart of FIG. 10. The processing in steps S804 and S805 is the same as that in the first embodiment.

In step S1001, the plane detection unit 901 sets a plurality of determination areas in the height image. A method for setting determination areas will be explained later with reference to FIG. 11.

In step S1002, the plane detection unit 901 selects one determination area.

In step S1003, the plane detection unit 901 determines whether or not the first area included in the determination area is a plane. If the first area is a plane, namely, if the first plane is detected, the processing proceeds to step S1004. If the first area is not a plane, the processing proceeds to step S805, in which the determination unit 102 determines that no step is present.

In step S1004, the plane detection unit 901 determines whether or not the second area included in the determination area is a plane. If the second area is a plane, namely, if the second plane is detected, the processing proceeds to step S1005. If the second area is not a plane, the processing proceeds to step S805, in which the determination unit 102 determines that no step is present.

In step S1005, the determination unit 102 determines whether or not the two planes are at a predetermined height from a reference or higher, namely, whether or not the two planes are higher than the conveyance surface in this embodiment. Specifically, based on the height information, if it is determined that the first plane formed in the first area and the second plane formed in the second area are higher than the conveyance surface, the processing proceeds to step S1006. If it is determined that at least one of the first plane and the second plane is equal in height to the conveyance surface, the processing proceeds to step S805, in which the determination unit 102 determines that no step is present.

In step S1006, the determination unit 102 determines whether the difference in height between the two planes is greater than the threshold value. Specifically, if it is determined that the difference in height between the first plane and the second plane is greater than the threshold value, the processing proceeds to step S804, in which the determination unit 102 determines that a step is present. If it is determined that the difference in height between the first plane and the second plane is smaller than the threshold value, the processing proceeds to step S805, in which the determination unit 102 determines that no step is present.

In step S1007, the determination unit 102 determines whether the processing has been completed for all determination areas. If it is determined that the processing has been completed for all determination areas, the processing proceeds to step S703. If there is an unprocessed determination area, the processing returns to step S1002 and the same processing is repeated.

A method for setting determination areas in a height image is explained below with reference to FIGS. 11A, 11B, 11C, and 11D.

Figure 11A:
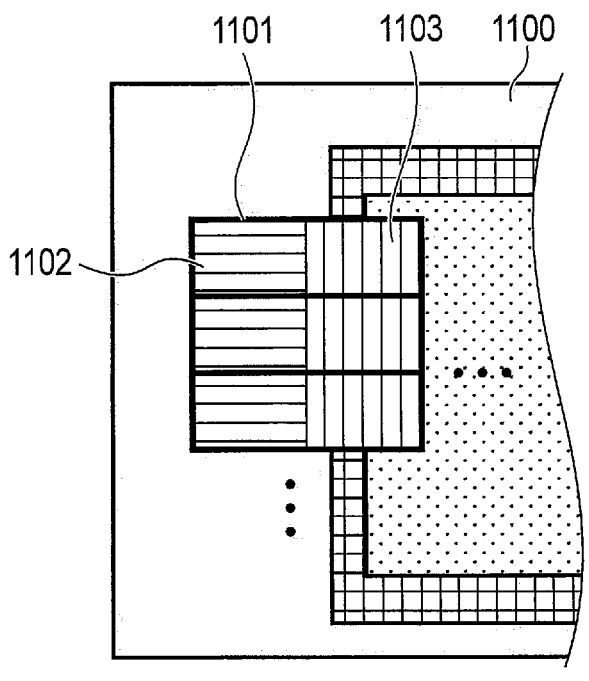
FIG. 11A is a view illustrating an example of a method for setting a determination area.

FIG. 11A illustrates an example in which a plurality of determination areas 1101 are arranged in a vertical direction of the figure of a height image 1100 as illustrated in FIG. 5. Each determination area 1101 is divided into left and right areas, namely, a first area 1102 and a second area 1103. The plane detection unit 901 determines whether the surface of the subject is a plane or not in each of the first area 1102 and the second area 1103. It is assumed that the determination areas 1101 are arranged without a gap therebetween in the entire height image 1100. However, the determination areas 1101 may be arranged with a predetermined gap if the gap is sufficiently small relative to the size of the determination areas 1101. Alternatively, the determination areas 1101 may partially overlap with one another.

Figure 11B:
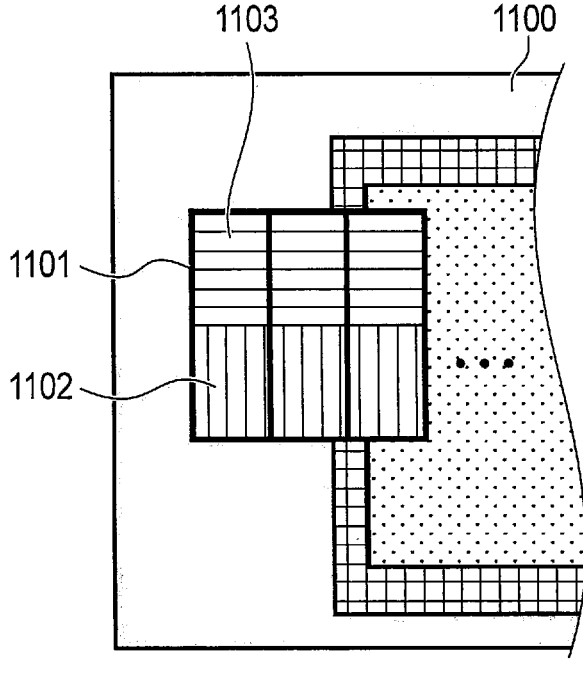
FIG. 11B is a view illustrating an example of a method for setting a determination area.

FIG. 11B illustrates an example in which a plurality of determination areas 1101 are arranged in a transverse direction of the figure of the height image 1100, and each determination area 1101 is divided into upper and lower areas, namely, a first area 1102 and a second area 1103.

FIG. 11C illustrates an example in which a plurality of determination areas 1101 are arranged in a slanting direction of the figure of the height image 1100. In each determination area 1101, a second area 1103 is located diagonally to the upper right of a first area 1102.

FIG. 11D illustrates an example in which a plurality of determination areas 1101 are arranged in a slanting direction of the figure of the height image 1100. In each determination area 1101, a second area 1103 is located diagonally to the lower right of a first area 1102.

Setting of the determination areas 1101 illustrated in FIGS. 11A to 11D may use at least one of the arrangement patterns illustrated in FIGS. 11A to 11D in one measurement. In other words, the determination unit 102 may determine a presence or absence of a step using any one of the arrangement patterns, or using a combination of two or more arrangement patterns. If a combination of two or more arrangement patterns is used, a presence or absence of a step is determined on various surfaces. Therefore, a step can be detected with a higher accuracy.

In the examples illustrated in FIGS. 11A to 11D, a plurality of determination areas 1101 are set. However, only one determination area 1101 may be set. The shape of the determination areas 1101 is not limited to a rectangle, but may be any shape, such as a circle, a polygon, etc. Furthermore, determination areas of different shapes may be arranged in combination. The determination areas 1101 may have any size, and the determination areas 1101 of different sizes may be arranged in combination. For example, the size of the determination areas 1101 may be set based on a calculation amount that can be calculated in a permissible processing time from a detection of a step and determination of a state of overlapped feeding of packages until a change of a direction of conveyance of the packages in the state of overlapped feeding by the excluding mechanism 13 in the conveyance system illustrated in FIG. 1. Specifically, if large determination areas 1101 are arranged at a predetermined gap therebetween, the number of determination areas to be processed will be reduced. Therefore, the processing time necessary to determine whether a step is present can be reduced. However, it should be noted that the determination areas should not be excessively reduced. For example, if a thin step is present in a central portion of a small area 1102, and if the number of determination areas is too small, the step may be overlooked; that is, it may be determined that no step is present in the subject in step S1003 or S1004.

A specific example of the plane detection processing of the plane detection unit 901 in step S1003 will be explained with reference to FIG. 12.

FIG. 12 is a view illustrating a state in which a package 1250 is overlapped on a package 1200 viewed from a side of the packages. The determination areas 1101 are set in areas of the packages viewed from a top of the packages as shown in FIG. 11. In the example illustrated in FIG. 12, it is assumed that one determination area is viewed from a side of the packages.

As a specific plane detection method, an average value $\mu_{1z}$ and a standard deviation $\sigma_{1z}$ of a height $z_{1i}$ acquired from different pixel positions 1201 $(x_{1i}, y_{1i})$ $(i=0, \ldots N_1-1)$ at $N_1$ positions ($N_1$ is an integer of 2 or more) in the first area 1102 are calculated as expressed by equation (1).

$$\mu_{1z} = \frac{1}{N_1}\sum_{i=0}^{N_1-1} z_{1i}, \; \sigma_{1z} = \sqrt{\frac{1}{N_1}\left(\sum_{i=0}^{N_1-1}(z_{1i}-\mu_{1z})^2\right)} \tag{1}$$

If a standard deviation $\sigma_{1z}$ is smaller than a predetermined threshold value $T_p$, it means that the heights of packages included in the first area 1102 do not vary. Therefore, it can be determined that the first area 1102 forms a first plane. Similarly, an average value $\mu_{2z}$ and a standard deviation $\sigma_{2z}$ of a height $z_{2i}$ acquired from different pixel positions 1202 $(x_{2i}, y_{2i})$ (i=0, . . . N$_2$–1) at N$_2$ positions (N$_2$ is an integer of 2 or more) in the second area 1103 are calculated. If a standard deviation $\sigma_{2z}$ is smaller than a predetermined threshold value $T_p$, this means that the heights of packages included in the second area 1103 do not vary. Therefore, it can be determined that the second area 1103 forms a second plane. Thus, even if defective pixels 1203 at which height information cannot be acquired are present in profiles or if noise is superimposed on a height value, the influence of the defective pixels or the noise can be reduced by averaging the heights in the first area 1102 and the heights in the second area 1103.

Subsequently, specific examples of the processes in the determination unit 102 in steps S1005 and S1006 will be explained.

The determination unit 102 determines in step S1005 whether the average value $\mu_{1z}$ of the heights of the first plane and the average value $\mu_{2z}$ of the heights of the second plane are greater than the height of the conveyance surface. Specifically, assuming that the height of the conveyance surface is "0", it suffices that whether the conditions $\mu_{1z}>0$ and $\mu_{2z}>0$ are satisfied is determined. If the conditions $\mu_{1z}>0$ and $\mu_{2z}>0$ are satisfied, the determination unit 102 determines that the first plane and the second plane are higher than the conveyance surface. In case that noise is superimposed on a height measurement result, a threshold value, which is a positive real number designated by a user, may be used instead of 0.

Regarding the determination of the difference in height between the first plane and the second plane $|\mu_{2z}-\mu_{1z}|$ in step S1006, it suffices that a presence of a step is determined if equation (2) below is satisfied, namely, if the difference in height $|\mu_{2z}-\mu_{1z}|$ is greater than a threshold value. The right side of equation (2) represents the threshold value, using parameters $\alpha$ and $\beta$, which are real numbers designated by the user in advance. $\alpha$ is a coefficient that increases the threshold value for a plane having a relatively large standard deviation, namely, having a relatively large unevenness, and $\beta$ is a value of a height that is a base of the threshold value.

$$|\mu_{2z}-\mu_{1z}|>\alpha(\sigma_{1z}+\sigma_{2z})+\beta \tag{2}$$

A situation in which a small change in unevennesses is erroneously determined as a step can be avoided by increasing the dimensions of a rectangle of the first area 1102 or the second area 1103. Furthermore, even if a shadow is formed, whether a step is present or not can be determined by increasing the dimensions of the rectangle of the first area 1102 or the second area 1103 to be greater than the greatest width of a shadow calculated from an assumed height of a package and a setting angle of the imaging apparatus 11 and disregarding defective pixels 1203 which are in shadow and for which height information cannot be acquired in the calculation of an average and a standard deviation of the heights of the packages.

According to the second embodiment described above, determination areas are set in a height image. In each determination area, the first plane in the first area and the second plane in the second area are detected. If it is determined that the first plane and the second plane are higher than the conveyance surface and the difference in height between the first plane and the second plane is equal to or greater than the threshold value, a presence of a step is detected. By determining the presence of a step by using the average of heights of the planes in the area, the presence of a step can be determined even if noise is included in the profile or there is a defective area in which height information cannot be acquired. Furthermore, by determining whether a step is present using planes, the possibility of an error in which a small unevenness is erroneously determined as a step can be reduced. Thus, the determination accuracy relating to overlapped feeding of packages can be improved, while the influence of noise and a defective pixel is reduced.

Third Embodiment

In the second embodiment, if a plane of a package is inclined, values of heights in a determination area will vary widely, and the inclined plane cannot be detected as a plane. In such a case, a step may be overlooked.

To avoid this, in the third embodiment, a bend of a plane is detected, so that whether overlapped feeding is occurring can be determined even from an inclined plane.

Configurations of a detection apparatus of the third embodiment are the same as those of the second embodiment, and detailed explanations thereof are omitted.

Plane determination processing of the plane detection unit 901 according to the third embodiment will be explained with reference to FIG. 13.

The plane detection unit 901 sets determination areas in a height image in the same manner as in the second embodiment. The plane detection unit 901 models a surface of the package 1200 in the first area 1102 as a planar model $z_1=a_1x+b_1y+c_1$, thereby calculating a first regression plane 1301. Values of the parameters $(a_1, b_1, C_1)$ of the planar model minimize a regression error $E_1$ calculated by equation (3) using a height $(x_{1i}, y_{1i}, z_{1i})$ (i=0, . . . , N$_1$–1) corresponding to a pixel position in the first area 1102.

$$E_1 = \sqrt{\frac{1}{N_1}\sum_{i=0}^{N_1-1}(z_{1i}-(a_1x_{1i}+b_1y_{1i}+c_1))^2} \tag{3}$$

Using the same threshold value as in the second embodiment, if the regression error $E_1$ is smaller than the threshold value $T_p$, it is determined that the first plane is detected in the first area 1102, and if the regression error $E_1$ is equal to or greater than the threshold value $T_p$, it is determined that the first area 1102 is not a plane.

Similarly, regarding the second area 1103, a surface of the package 1250 in the second area 1103 is modeled as a planar model $z_2=a_2x+b_2y+c_2$, thereby calculating a second regression plane 1302. Values of the parameters $(a_2, b_2, c_2)$ of the planar model minimize a regression error $E_2$ calculated by equation (3) similarly. If the regression error $E_2$ is smaller than the threshold value $T_p$, it is determined that the second plane is detected in the second area 1103, and if the regression error $E_2$ is equal to or greater than the threshold value $T_p$, it is determined that the second area 1103 is not a plane. In the calculation of the regression planes and the regression errors, it is assumed that height information is acquired at four or more points in each of the first area 1102 and the second area 1102.

In the third embodiment, an amount corresponding to the difference in height $|\mu_{2z}-\mu_{1z}|$ in the second embodiment is calculated from a difference in height between a center of gravity of points at which height information is acquired in one area and a height of the regression plane in the other area. Specifically, in the example shown in FIG. 13, a difference in height $h_{12}$ between the regression plane in the second planar model and the center of gravity of the first plane and a difference in height $h_{21}$ between the regression plane in the first planar model and the center of gravity of the second plane are calculated. The difference $h_{12}$ in height is defined by using the centers of gravity $(x^{-}_1, y^{-}_1, z^{-}_1)$ of points at which the height information is acquired in the first area 1102 and the parameters $(a_2, b_2, c_2)$ of the planar model calculated in the second area 1103. The superscript bar "−" indicates that the value is of the center of gravity of coordinates at which height information is acquired in the first area. Each of the centers of gravity $(x^{-}_1, y^{-}_1, z^{-}_1)$ can be obtained from equation (4), and the difference in height $h_{12}$ is expressed by equation (5).

$$\bar{x}_1 = \frac{1}{N_1}\sum_{i=0}^{N_1-1}x_{1i},\ \bar{y}_1 = \frac{1}{N_1}\sum_{i=0}^{N_1-1}y_{1i},\ \bar{z}_1 = \frac{1}{N_1}\sum_{i=0}^{N_1-1}z_{1i} \quad (4)$$

$$h_{12} = \bar{z}_1 - (a_2\bar{x}_1 + b_2\bar{y}_1 + c_2) \quad (5)$$

Similarly, the difference in height $h_{21}$ is defined by equation (6), using the centers of gravity $(x^{-}_2, y^{-}_2, z^{-}_2)$ of points at which the height information is acquired in the second area 1103 and the parameters $(a_1, b_1, c_1)$ of the planar model calculated in the first area 1102.

$$h_{21} = \bar{z}_2 - (a_1\bar{x}_2 + b_1\bar{y}_2 + C_1) \quad (6)$$

In the determination of whether the first plane and the second plane are higher than the conveyance surface in step S1005 described above, it suffices that the determination unit 102 determines whether the centers of gravity $z^{-}_1$ and $z^{-}_2$ at which the height information is obtained in the first area 1102 and the second area 1103 are higher than the conveyance surface, namely, whether the conditions $z^{-}_1>0$ and $z^{-}_2>0$ are satisfied.

The magnitudes $|h_{12}|$ and $|h_{21}|$ of the differences in height $h_{12}$ and $h_{21}$ are equal to $|\mu_{2z}-\mu_{1z}|$ utilized to determine the difference in height between packages in the second embodiment, if both the first plane and the second plane are parallel to the conveyance surface.

If the mathematical signs of the differences in height $h_{12}$ and $h_{21}$ are different, whether the first plane and the second plane are higher than the conveyance surface is determined by using a harmonic average $H_{12}$ of the difference in height $|h_{12}|$ and $|h_{21}|$. Specifically, the harmonic average $H_{12}$ is calculated by equation (7).

$$H_{12} = \frac{2|h_{12}||h_{21}|}{|h_{12}| + |h_{21}|} \quad (7)$$

The determination unit 102 determines that a step is present in the determination area, if the harmonic average $H_{12}$ satisfies the condition "$H_{12}>\alpha(E_1+E_2)+\beta$". The parameters $\alpha$ and $\beta$ are the same as those in the second embodiment.

Instead of using the harmonic average, a smaller one of the differences in height $|h_{12}|$ and $|h_{21}|$ may be used. For example, if $|h_{12}|$ is smaller than $|h_{21}|$, it is determined whether the condition "$h_{12}>\alpha(E_1+E_2)+\beta$" is satisfied. If the condition is satisfied, it is possible to determine that a step is present in the determination area. In this manner, the calculation cost can be reduced.

Next, the case in which mathematical signs of the differences in height $h_{12}$ and $h_{21}$ are different will be explained with reference to FIG. 14.

The mathematical signs of differences in height $h_{12}$ and $h_{21}$ include information on the shape of a surface of a package, and the differences $h_{12}$ and $h_{21}$ in height can be expressed as vectors. Specifically, if the mathematical signs of differences in height $h_{12}$ and $h_{21}$ are negative, they can be expressed as downward vectors. If the mathematical signs of differences in height $h_{12}$ and $h_{21}$ are positive, they can be expressed as upward vectors.

If both the differences in height are positive numbers or negative numbers, it is highly probable that the first area 1102 and the second area 1103 do not include a step, but include a bend or unevenness. If mathematical signs of differences in height $h_{12}$ and $h_{21}$ are the same, the determination unit 102 determines that the determination area does not include a step.

If a first vector which corresponds to the difference in height $h_{12}$ and which is directed from a point on the second regression plane 1302 corresponding to the coordinates $(x^{-}_1, y^{-}_1)$ of the center of gravity of the first area to the first regression plane 1301 at the shortest distance is equal in direction to a second vector which corresponds to the difference in height $h_{21}$ and which is directed from a point on the first regression plane corresponding to the plane coordinates $(x^{-}_2, y^{-}_2)$ of the center of gravity of the second regression plane to the second regression plane at the shortest distance, it is considered that the first regression plane intersects the second regression plane. Thus, the determination unit 102 determines that no step is present. In the example shown in FIG. 12, since the first vector and the second vector have the same downward direction, it is determined that no step is present, for example, that the package relating to the determination areas is bent.

On the other hand, as described above, if the first vector and the second vector have different directions, the determination unit 102 determines that no step is present.

In the example described above, the first regression plane of the first area and the second regression plane of the second area are independently calculated with different parameters; however, a parameter representing an inclination of the planes may be used in common.

For example, it suffices that a problem to minimize an error $E_{12}$ is solved using equation (8) by setting $a_1=a_2$ and $b_1=b_2$.

$$E_{12} = \sqrt{\frac{1}{N_1+N_2}\left(\sum_{i=0}^{N_1-1}(z_{1i}-(ax_{1i}+by_{1i}+c_1))^2 + \sum_{i=0}^{N_2-1}(z_{2i}-(ax_{2i}+by_{2i}+c_2))^2\right)} \quad (8)$$

Regarding whether the first area and the second area are planes or not, for example, the determination unit 102 determines that they are planes if the regression error $E_{12}$ is smaller than the threshold value $T_p$, and are not planes if the regression error $E_{12}$ is equal to or greater than the threshold value $T_p$. Further, if the regression error $E_{12}$ is used, the overlap detection unit 103 may determine whether a step is present using $|c1-c2|>\alpha E_{12}+\beta$, instead of determining whether the difference in height between the planes is greater than the threshold value using equation (2).

Furthermore, the overlap detection unit 103 may determine whether the overlapped feeding is occurring in consideration of the locations of the determination areas, in addition to consideration of whether the number of determination areas determined to be including steps is equal to or greater than the threshold value. For example, if it is determined that a step is present in the uppermost determination area 1101 in FIG. 11A, and if it is determined that no step is present in the adjacent determination area 1101 next to the uppermost determination area, it is possible to determine that the overlapped feeding is not occurring even though the step determination result in the uppermost determination area indicates that a step is present. In this manner, the influence of the displacement of packages on the overlapped feeding determination result can be reduced by setting each determination area to be small and taking the adjacency relationship between determination areas into consideration.

According to the third embodiment described above, the first regression plane in the first area and the second regression plane in the second area in each determination area are calculated, and a difference in height in each area is calculated. In consideration of the sign of the difference in height, if the vector of the difference in height in the first area and the vector of the difference in height in the second area are the same in direction, it is determined that there is no step. Thus, even if a surface of a package is inclined, a step can be detected by detecting a plane. Therefore, the overlapped feeding can be detected with a higher accuracy.

In the above explanations, an image covering the entire shape of a package is used as a height image. However, in each of the first to third embodiments, the height image may be a partial image of the package.

An example of using a partial image as the height image will be explained with reference to FIG. 15.

FIG. 15 shows time T2 to time T6 for sampling profiles in time sequence with regard to the height image illustrated in FIG. 5.

For example, it is assumed that a long package is conveyed. To acquire an image entirely covering the long package by the imaging apparatus 11, it is necessary for the user to wait until the rear end of the package passes the imaging area of the imaging apparatus. In addition, since the image of the long package includes a large number of pixels, a long calculation time is required to determine overlapped feeding; in other words, a latency for the excluding mechanism to be driven is increased. To avoid this, as illustrated in FIG. 15, if the height image is divided into a plurality of strips across the direction of travel of packages, in the case of overlapped feeding of packages, the latency, after the detection apparatus 10 has completed the processing before the excluding mechanism 13 is driven, can be reduced. As a result, the length of the conveyance path (conveyor length) can be shortened.

The acquisition unit 101 divides the height image into a plurality of parts across the direction of travel of packages, and acquires partial images. Specifically, referring to FIG. 15, instead of starting the processing in the determination unit 102 and the overlap detection unit 103 after all profiles are acquired in the range from time T2 to time T6, a partial image 1501 is generated and the processing in the determination unit 102 and the overlap detection unit 103 are started, when a profile in the range from time T2 to time T4 has been acquired. While the partial image 1501 is being processed, a profile in the range from time T4 to time T5 is acquired in parallel, and a partial image 1502 of the range from time T3 to T5 is generated. Thereafter, the partial image 1502 is sequentially processed by the determination unit 102 and the overlap detection unit 103. Thus, even if a long package is conveyed, overlapped feeding detection processing can be started each time a part of the long package passes the detection apparatus, since the processing is sequentially performed each time the profile in a predetermined range is acquired. Moreover, if the overlapped feeding detection processing is started earlier, the time from the passing of the rear end of the package until the excluding mechanism 13 is driven can be reduced.

In the embodiments described above, it is assumed that the detection apparatus 10 is used for determining overlapped feeding of packages in a conveyance system. However, the embodiments are not limited to the above, but can be applied to a use for determining an overlapped state of objects, so that the objects can be taken one by one in, for example, object picking processing.

An example of a hardware configuration of the detection apparatus 10 according to each embodiment is shown in the block diagram illustrated in FIG. 16.

The detection apparatus 10 includes a central processing unit (CPU) 1601, a random access memory (RAM) 1602, a read only memory (ROM) 1603, a storage 1604, a display 1605, an input device 1606, and a communication device 1607, all of which are connected by a bus.

The CPU 1601 is a processor that executes a calculation process and a control process in accordance with programs. The CPU 1601 executes the processing in each unit of the detection apparatus 10 using a predetermined area of the RAM 1602 as a work area in cooperation with programs stored in the ROM 1603, the storage 1604, and the like.

The RAM 1602 is a memory, such as a synchronous dynamic random access memory (SDRAM). The RAM 1602 functions as a work area of the CPU 1601. The ROM 1603 is a memory storing programs and various information in a non-rewritable manner.

The storage 1604 is a device that writes and reads data in and from a magnetic recording medium, such as a hard disk drive (HDD), a semiconductor storage medium, such as a flash memory, a magnetically recordable storage medium, such as an HDD, an optically recordable storage medium, or the like. The storage 1604 writes and reads data in and from the storage medium under the control of the CPU 1601.

The display 1605 is a display device, such as a liquid crystal display (LCD). The display 1605 displays various information based on a display signal from the CPU 1601.

The input device 1606 is an input device, such as a mouse and a keyboard. The input device 1606 receives information input by the user as an instruction signal, and outputs the instruction signal to the CPU 1601.

The communication device 1607 communicates with an external device through a network under the control of the CPU 1601.

The instructions included in the process sequences described in the aforementioned embodiments can be implemented based on a software program. A general-purpose computer system may store the program beforehand and read the program in order to attain the same effects as those of the control operation of the aforementioned detection apparatus. The instructions in the embodiments described above are stored, as a program executable by a computer, in a magnetic disc (flexible disc, hard disc, etc.), an optical disc (CD-ROM, CD-R, CD-RW, DVD-ROM, DVD±R, DVD±RW, Blu-ray (registered trademark) disc, etc.), a semiconductor memory, or a similar storage medium. As long as the storage medium is readable by a computer or by a built-in system, any storage format can be used. An operation similar to the control of the detection apparatus of the embodiments described above can be realized if a computer reads a program from the storage medium, and executes the instructions written in the program on the CPU based on the program. The computer may, of course, acquire or read the program by way of a network.

In addition, an operating system (OS) working on a computer, database management software, middleware (MW) of a network, etc. may execute a part of the processing to realize the embodiments based on instructions of a program installed from a storage medium onto a computer and a built-in system.

Furthermore, the storage medium according to the embodiments is not limited to a medium independent from a system or a built-in system, and may include a storage medium storing or temporarily storing a program downloaded through a LAN or the Internet, etc.

Moreover, the number of storage media is not limited to one. The embodiments include the case where the process is executed by means of a plurality of storage media, and the storage media can take any configuration.

The computer or built-in system in the embodiments are used to execute each processing in the embodiments, based on a program stored in a storage medium, and the computer or built-in system may be an apparatus consisting of a PC, a microcomputer or the like, or may be a system or the like in which a plurality of apparatuses are connected through a network.

The computer adopted in the embodiments is not limited to a PC; it may be a calculation processing apparatus, a microcomputer, or the like included in the detection apparatus, and a device and apparatus that can realize the functions of the embodiments by a program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A detection apparatus comprising a processor configured to:

acquire height information at a plurality of points in a subject corresponding to one or more physical objects while the one or more physical objects are being conveyed by a conveyance mechanism;

determine, based on the height information, whether one or more steps are present at respective measurement locations, each step corresponding to difference between height information at spatially distinct portions of the subject that is a height equal to or higher than a predetermined height from a reference in the subject;

detect that the subject is in a state in which a plurality of the one or more physical objects are overlapped, if a number of the steps determined at the respective measurement locations is equal to or greater than a first threshold value; and control an excluding mechanism associated with the conveyance mechanism such that, in response to detecting feeding of a single object of the one or more physical objects, the single object is fed in a direction toward a downstream side of the conveyance mechanism, and in response to detecting overlapped feeding of a plurality of the one or more physical objects, the plurality of the one or more physical objects are fed in a direction different from the downstream side.

2. The apparatus according to claim 1, wherein the processor is further configured to:

detect whether each of a first area and a second area set in the subject based on the height information forms a plane; and determine that the steps are present, if it is detected that a first plane is formed in the first area and a second plane is formed in the second area, and if a difference in height between the first plane and the second plane is greater than a second threshold value.

3. The apparatus according to claim 2, wherein the processor is further configured to determine that no step is present, if the difference in height between the first plane and the second plane is equal to or smaller than the second threshold value.

4. The apparatus according to claim 2, wherein the processor is further configured to:

calculate a first regression plane of the first plane and a second regression plane of the second plane; and determine that no step is present, if a first vector is identical in direction to a second vector, the first vector being a vector which, on an assumption that the second regression plane is extended to the first area, is directed from a point on the second regression plane in the first area to the first regression plane at a shortest distance, the second vector being a vector which, on an assumption that the first regression plane is extended to the second area, is directed from a point on the first regression plane in the second area to the second regression plane at a shortest distance.

5. The apparatus according to claim 4, wherein the processor is further configured to determine that the steps are present, if the first vector and the second vector are different in direction.

6. The apparatus according to claim 2, wherein the processor is further configured to:

calculate a first regression plane of the first plane and a second regression plane of the second plane; and determine that the steps are present if a value obtained by subtracting a result of multiplying a sum of a regression error of the first regression plane and a regression error of the second regression plane by a first value from a difference in height relating to the first regression plane and the second regression plane is greater than the second threshold value.

7. The apparatus according to claim 2, wherein the first area and the second area are rectangular, and the processor is further configured to determine whether or not the steps are present, using at least one of:

a first determination result of determining whether or not the plane is present in each of the first area and the second area arranged in a vertical direction;

a second determination result of determining whether or not the plane is present in each of the first area and the second area arranged in a transverse direction; and a third determination result of determining whether or not the plane is present in each of the first area and the second area arranged in a slanting direction.

8. The apparatus according to claim 1, wherein the processor is further configured to;

detect whether each of a first area and a second area set in the subject based on the height information forms a plane; and determine that no step is present, if it is detected that at least one of the first area and the second area forms no plane.

9. The apparatus according to claim 1, wherein the processor is further configured to detect that the subject is in a state in which a plurality of the one or more physical objects are overlapped, if the number of steps is equal to or greater than the first threshold value and if a plurality of steps are spatially adjacent.

10. The apparatus according to claim 1, wherein the processor is further configured to detect that the subject is a single object, if the number of steps is smaller than the first threshold value or if the number of steps is equal to or greater than the first threshold value and the steps are not spatially adjacent.

11. A conveyance system comprising the detection apparatus according to claim 1, the conveyance mechanism configured to convey objects, and the excluding mechanism.

12. A detection method comprising:

acquiring height information at a plurality of points in a subject corresponding to one or more physical objects while the one or more physical objects are being conveyed by a conveyance mechanism;

determining, based on the height information, whether or not one or more steps are present at respective measurement locations, each step corresponding to a height difference between height information at spatially distinct portions of the subject that is equal to or higher than a predetermined height from a reference in the subject;

detecting that the subject is in a state in which a plurality of the one or more physical objects are overlapped, if a number of the steps determined at the respective measurement locations is equal to or greater than a first threshold value; and controlling an excluding mechanism associated with the conveyance mechanism such that, in response to detecting feeding of a single object of the one or more physical objects, the single object is fed in a direction toward a downstream side of the conveyance mechanism, and in response to detecting overlapped feeding of a plurality of the one or more physical objects, the plurality of the one or more physical objects are fed in a direction different from the downstream side.

\* \* \* \* \*